United States Patent [19]
Sato et al.

[11] Patent Number: 5,152,191
[45] Date of Patent: Oct. 6, 1992

[54] CONTROL SYSTEM OF A CONTINUOUSLY VARIABLE TRANSMISSION FOR A FOUR-WHEEL MOTOR VEHICLE

[75] Inventors: Keiji Sato, Musashino; Motohisa Miyawaki, Kawasaki, both of Japan

[73] Assignee: Fuji Jukogyo Kabushiki Kaisha, Tokyo, Japan

[21] Appl. No.: 628,169

[22] Filed: Dec. 14, 1990

[30] Foreign Application Priority Data

Dec. 28, 1989 [JP] Japan .................................. 1-343304
Dec. 28, 1989 [JP] Japan .................................. 1-343309

[51] Int. Cl.$^5$ .......................... F16H 59/66; B60T 8/10
[52] U.S. Cl. ........................................ 74/844; 74/856;
364/424.1; 364/426.02; 180/197
[58] Field of Search ................... 474/69; 74/866, 844,
74/856; 364/424.1, 426.02, 426.03; 180/248, 249, 197

[56] References Cited

U.S. PATENT DOCUMENTS

| 4,671,373 | 6/1987 | Sigl | 74/866 X |
|---|---|---|---|
| 4,682,667 | 7/1987 | Hosaka | 364/426.02 X |
| 4,715,467 | 12/1987 | Sakai | 74/866 X |
| 4,825,368 | 4/1989 | Itoh et al. | 74/866 X |
| 4,926,329 | 5/1990 | Stelter et al. | 364/424.1 X |
| 4,987,967 | 1/1991 | Kouno | 364/424.1 X |
| 4,989,686 | 2/1991 | Miller et al. | 364/426.03 |
| 5,002,147 | 3/1991 | Tezuka et al. | 364/426.02 X |
| 5,012,696 | 5/1991 | Miyawaki | 74/866 |
| 5,046,787 | 9/1991 | Kuwana et al. | 180/197 X |
| 5,058,019 | 10/1991 | Lithonhi | 364/426.02 |
| 5,097,921 | 3/1992 | Tezuka | 364/426.03 X |

FOREIGN PATENT DOCUMENTS

1-52535 2/1989 Japan .
1-222364 9/1989 Japan .
1-222366 9/1989 Japan .

Primary Examiner—Richard Lorence
Assistant Examiner—Khoi Ta
Attorney, Agent, or Firm—Martin A. Farber

[57] ABSTRACT

A belt drive continuously variable transmission of a four-wheel motor vehicle has a transmission ratio control valve which is operated in accordance with driven pulley speed. An analogous driven-pulley speed is calculated based on an analogous vehicle speed approximate to actual vehicle speed. In response to the analogous driven-pulley speed, the analogous driven pulley speed is used for operating the transmission ratio control valve instead of the driven pulley speed.

2 Claims, 7 Drawing Sheets

CONTROL SYSTEM OF A CONTINUOUSLY VARIABLE TRANSMISSION FOR A FOUR-WHEEL MOTOR VEHICLE

BACKGROUND OF THE INVENTION

The present invention relates to a control system for a continuously variable belt-drive automatic transmission (CVT) for a four-wheel motor vehicle, and more particularly to a transmission control system for a four-wheel motor vehicle having a traction control system and an antilock brake system.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump for supplying oil to the servo device, a line pressure control valve and a transmission ratio control valve. Each valve comprises a spool to control the oil supplied to the servo device.

An electronic control system is provided for controlling the hydraulic circuit corresponding to the driving conditions of the motor vehicle. A desired transmission ratio is determined in accordance with vehicle speed and throttle valve opening degree to obtain the transmission ratio. Japanese Patent Application Laid-Open 64-52535 discloses such a system.

A four-wheel drive motor vehicle having a central differential is provided with a traction control system for restricting the differential operation in accordance with driving conditions, so that the output torque of a transmission is unequally distributed to front wheels and rear wheels of the vehicle.

Japanese Patent Applications Laid-Open 1-222364 and 1-222366 applicant disclose such systems.

The traction control system comprises a fluid operated multiple-disk friction clutch for restricting the differential operations, and an electronic control unit. The torque distributed to the front wheels and the rear wheels is controlled by controlling clutch torque of the friction clutch, thereby improving straight-ahead stability, accelerability and driveability.

If the front wheels slip or all the four wheels slip (slipping spin) at the same time on a slippery road, steering and driving of the vehicle become difficult.

In order to ensure a driving stability of the vehicle, the distribution of torque to the rear wheels is set to a larger value than that to the front wheels, so that the rear wheels may slip first. The traction control system (hereinafter called TCS) produces a control signal for controlling the torque distribution, thereby ensuring the driving force. Thus, the vehicle can be safely driven without a sudden change of driving stability.

In such a TCS, vehicle speed detecting means is provided for detecting vehicle speed based on speed of the output shaft of the transmission, in order to control the transmission ratio. However, if the front wheels or the rear wheels slip, the rotating speed of the slipping wheels, that is the speed of the output shaft of the transmission, does not correspond to the vehicle speed. Since the vehicle speed for controlling the transmission ratio does not correspond to the actual vehicle speed, the transmission ratio becomes unstable, and the line pressure reduces and causing slipping of the belt on the pulleys.

On the other hand, the antilock brake system (ABS) is provided for preventing the wheels from completely locking at rapid braking or at braking on slippery surfaces such as a snowy road, thereby ensuring directional stability and steering control of the vehicle during the braking operation and improving safety of the vehicle.

The ABS operates in such a manner as intermittently braking the wheels. Consequently, the rotating speed of the wheels, that is vehicle speed measured by the output shaft of the transmission changes at a short interval, and hence the transmission ratio fluctuates.

SUMMARY OF THE INVENTION

The object of the present invention is to provide a transmission control system which prevents the fluctuation of the transmission ratio at slipping of wheels, thereby ensuring stable operation of the transmission.

According to the present invention, there is provided a system for controlling a belt drive continuously variable transmission of a four-wheel motor vehicle having a central differential for distributing an output torque of the transmission to the front wheels and the rear wheels of the vehicle, and a traction control system for restricting a differential operation of the central differential so as to change a distribution ratio to the front wheels and the rear wheels, the transmission having a hydraulic circuit including a transmission ratio control valve, sensing means for sensing rotating speed of a driven pulley of the transmission and for producing a driven pulley speed signal, and control means responsive to the driven pulley speed signal for operating the transmission ratio control valve.

The system comprises means for producing an analogous vehicle speed signal representing a vehicle speed approximate to actual vehicle speed, calculator means responsive to the analogous vehicle speed signal for calculating a analogous driven-pulley speed signal, selecting means responsive to the analogous driven-pulley speed signal for applying the analogous driven-pulley speed signal to the control means instead of the driven pulley speed, whereby controlling the transmission ratio control valve.

In an aspect of the invention, the means is the traction control system.

The other objects and features of this invention will be apparently understood from the following description with reference to the accompanying drawings.

DETAILED DESCRIPTION OF THE PREFERRED EMBODIMENTS

Figure 1:
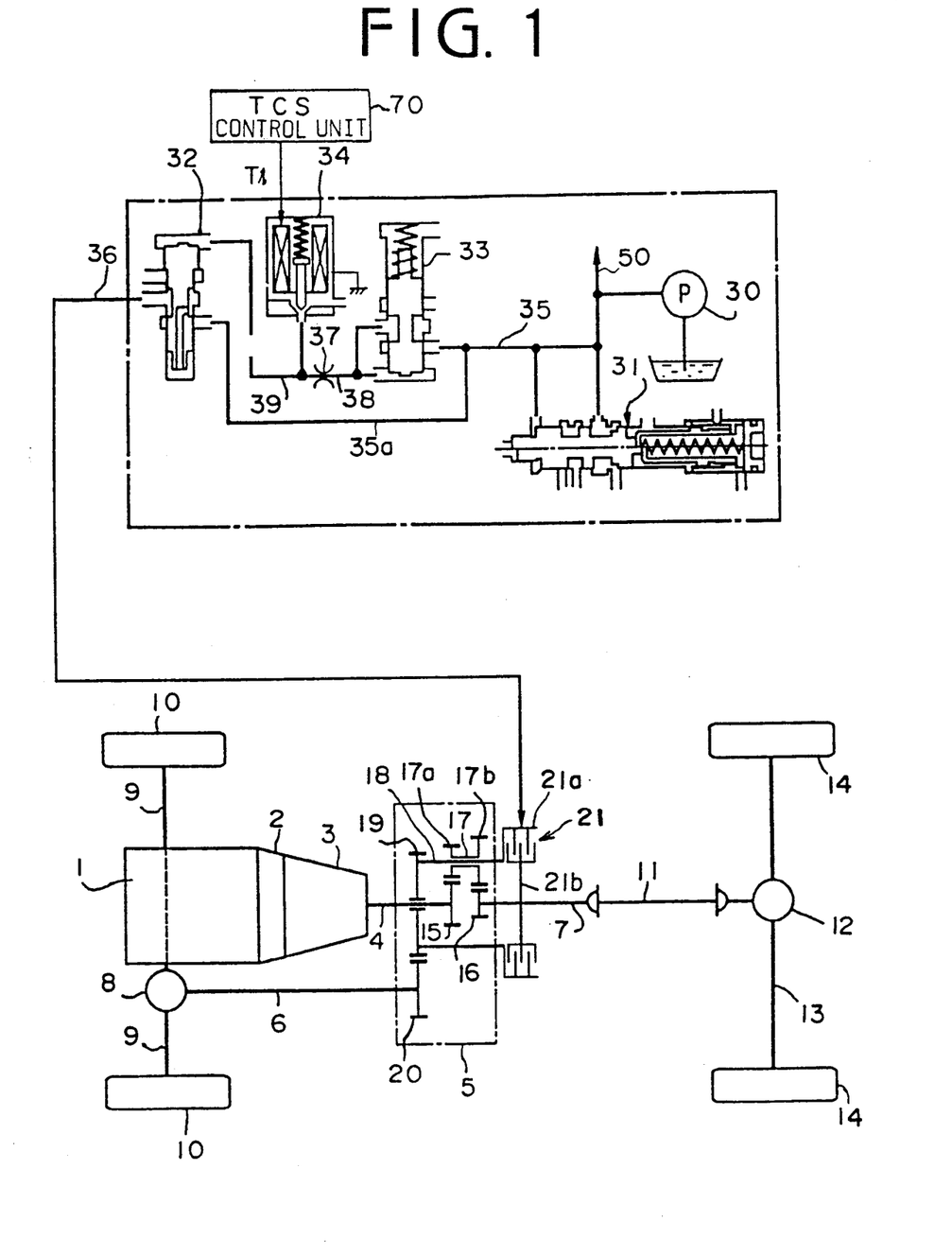
FIG. 1 is a schematic diagram showing a power transmission system for a four-wheel drive motor vehicle according to the present invention.

FIG. 1 shows a power transmission system for a four-wheel drive motor vehicle having a central differential according to the present invention. An engine 1 is mounted on a front portion of the vehicle. A clutch 2 and a continuously variable belt-drive automatic transmission 3 are disposed at the rear of the engine 1 in the longitudinal direction of the vehicle. An output of the transmission 3 is transmitted to an output shaft 4 which is aligned with a central differential 5 for rearwardly transmitting the torque. The output shaft 4 is connected to a front drive shaft 6 which disposed is parallel under the transmission 3 through a pair of reduction gears 19 and 20 of the central differential 5. The front drive shaft 6 is connected to front wheels 10 through a front differential 8 and axles 9. The output shaft 4 is connected to a rear drive shaft 7 through the central differential 5. The rear drive shaft 7 is connected to rear wheels 14 through a propeller shaft 11, a rear differential 12 and axles 13.

The central differential 5 is a complex planetary gear device and comprises a first sun gear 15 integrally formed on the output shaft 4, a second sun gear 16 integrally formed on the rear drive shaft 7, and a combined planetary pinion 17 comprising a first planetary pinion 17a meshed with the first sun gear 15, and a second planetary pinion 17b meshed with the second sun gear 16, and supported on a carrier 18. The carrier 18 is connected to the reduction drive gear 19.

Thus, the output torque from the output shaft 4 of the transmission 3 is transmitted to the carrier 18 and the second sun gear 16 through the first sun gear 15 and the pinions 17a, 17b at predetermined respective torque distribution ratios. The difference between rotating speeds of the carrier 18 and the second sun gear 16 is absorbed by rotation of the first and second planetary pinions 17a and 17b.

A fluid operated multiple-disk friction clutch 21 is provided adjacent the central differential 5 for restricting the differential operation of the central differential 5.

The clutch 21 comprises a drive drum 21a secured to the carrier 18, and a driven drum 18b secured to the rear drive shaft 7. When a differential operation restricting clutch torque Tc is produced in the clutch 21, a part of the output torque of the second sun gear 16 is transmitted to the front wheels 10, thereby changing the distribution of the torque. The carrier 18 is coupled with the second sun gear 16 when the clutch 21 is entirely engaged, thereby locking the central differential 5.

A hydraulic circuit of a control system for the clutch 21 comprises an oil pump 30, a pressure regulator valve 31, a pilot valve 33, a clutch control valve 32 and a solenoid operated duty control valve 34. The regulator valve 31 operates to regulate the pressure of oil supplied from the oil pump 30 driven by the engine 1 to produce a line pressure and the line pressure is applied to a line pressure conduit 35. The conduit 35 is communicated with a passage 38 through the pilot valve 33. The passage 38 is communicated with the solenoid operated duty control valve 34 downstream of an orifice 37, and with an end of the clutch control valve 32 through a passage 39. The conduit 35 is communicated with the clutch control valve 32 through a passage 35a. The clutch control valve 32 is communicated with the clutch 21 through a passage 36. The solenoid operated valve 34 is operated by pulses from a control unit 70 at a duty ratio determined therein, thereby controlling draining of the oil to provide a control pressure. The control pressure is applied to the clutch control valve 32 to control the oil supplied to the clutch 21 so as to control the clutch pressure (torque) and hence the clutch torque Tc.

Figure 2:
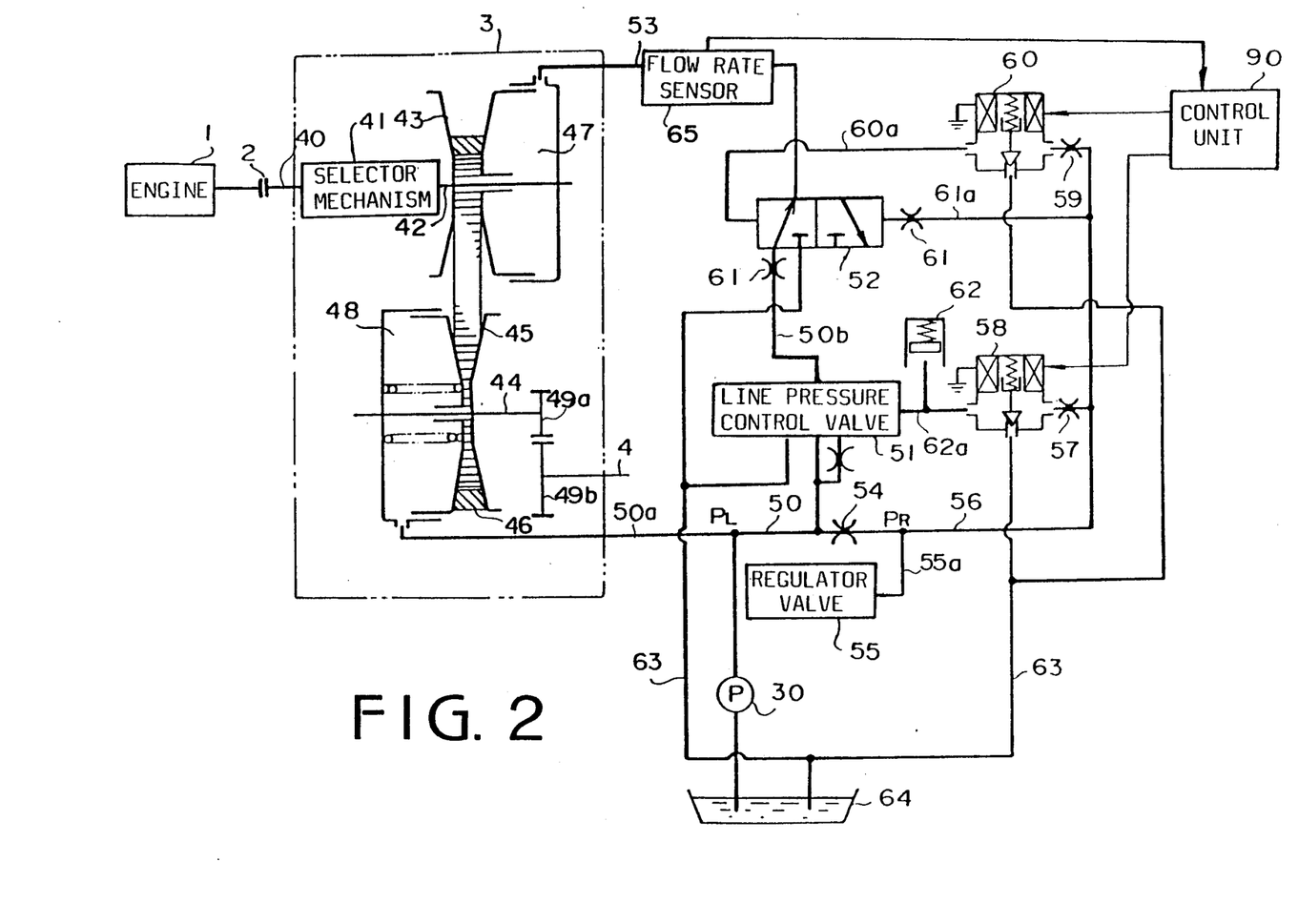
FIG. 2 is a schematic illustration showing a control system of a continuously variable belt-drive transmission according to the present invention.

Referring to FIG. 2, the continuously variable belt-drive automatic transmission 3 has an input shaft 40 connected to the clutch 2 for transmitting the power of an engine 1 to the transmission 3. The input shaft 40 is connected to a main shaft 42 through a selector mechanism 41. The belt-drive transmission 3 has an output shaft 44 provided in parallel with the main shaft 42. A drive pulley 43 provided with a hydraulic cylinder 47 is mounted on the main shaft 42. A driven pulley 45 provided with a hydraulic cylinder 48 is mounted on the output shaft 44. A drive belt 46 engages with the drive pulley 43 and the driven pulley 45. The cylinder 47 of the drive pulley 43 is so designed that the pressure receiving area thereof is larger than that of the cylinder 48 of the driven pulley 45. Thus, the running diameter of the belt 46 on the pulleys is varied dependent on driving conditions.

Secured to the output shaft 44 is a drive gear 49a which engages with a reduction gear 49b on the output shaft 4.

Describing a hydraulic control circuit of the transmission 3, oil in an oil reservoir 64 is supplied to a line pressure control valve 51 through a line pressure passage 50 by the pump 30. An oil passage 50a connected to the passage 50 is communicated with the cylinder 48 of the driven pulley 45. The passage 50 is further communicated with a transmission ratio control valve 52 through a passage 50b. The cylinder 47 of the drive pulley 43 is applied with pressurized oil through the passage 50, the line pressure control valve 51, the passage 50b, the transmission ratio control valve 52, and a passage 53.

The passage 50 connected to the oil pump 30 is communicated with a regulator valve 55 through a passage 55a for regulating the pressure of the oil.

The regulator valve 55 is communicated with the line pressure control valve 51 through the passage 55a, a passage 56 having an orifice 57, a solenoid operated valve 58, and a passage 62a having an accumulator 62. Further, the passage 56 is communicated with an end chamber of the transmission ratio control valve 52 through a passage 61a having an orifice 61, and with another end chamber through an orifice 59, a solenoid operated valve 60 and a passage 60a.

The solenoid operated valve 58 is adapted to be operated by duty signals from a control unit 90 for producing control pressure in the form of pulses. The pulsation of the control pressure is smoothed by the accumulator 62 and the control pressure is applied to the line pressure control valve 51, so that the line pressure $P_L$ is controlled in accordance with the transmission ratio i and engine torque T.

The solenoid operated valve 60 is also operated by duty signals and produces reducing pressure which is applied to the transmission ratio control valve 52 for shifting a spool of the valve 52 to an oil supply position and an oil drain position by a degree of a duty ratio. Thus, the flow rate Q of the oil supplied to or drained from the cylinder 47 of the drive pulley 43 is controlled to provide the optimum transmission ratio i and transmission ratio changing speed (rate) $di/dt$.

A flow rate sensor 65 is provided on the passage 53 for monitoring the flow rate Q supplied to or drained from the cylinder 47 and for producing a signal which is applied to the control unit 90 for a feedback control.

A drain port of each of the solenoid operated valves 58 and 60 is connected to a passage 63 to drain the oil to the reservoir 64.

Figure 3:
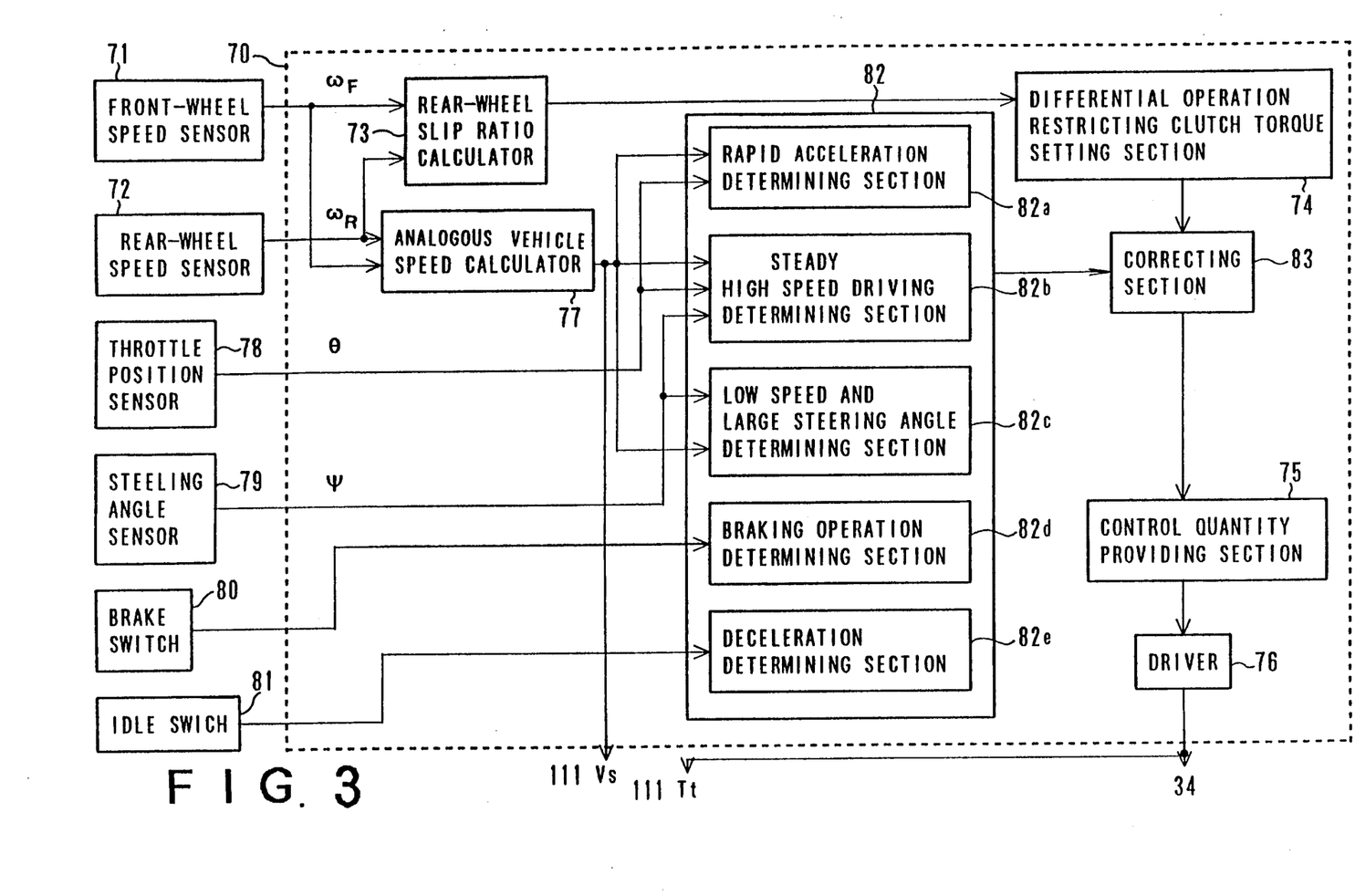
FIG. 3 is a block diagram showing a control unit of a traction control system.

Referring to FIG. 3 showing the TCS control unit 70, a principle for controlling the torque distribution is described hereinafter.

Figure 4A:
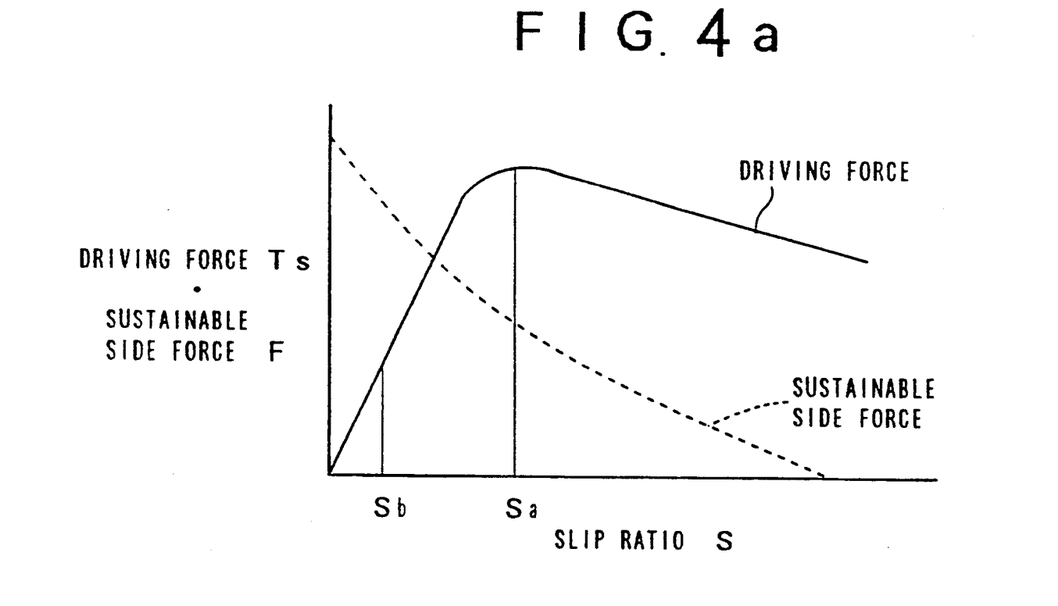
FIG. 4a a graph showing characteristics of driving force and side force corresponding to slip ratio.

The torque distribution is controlled by a feedback control based on the slip ratio of the rear wheels 14 because the torque to the rear wheels 14 is set to a value larger than that to the front wheels 10 by arranging the central differential 5 so that the rear wheels 14 slip first. FIG. 4a shows relationships between a driving force $T_S$ and a sustainable side force F corresponding to a slip ratio S. When the slip ratio S is zero, the sustainable side force F is maximum and gradually reduces as the slip ratio S increases. The driving force $T_S$ increases with the slip ratio S, and the force $T_S$ reduces when the slip ratio S exceeds a predetermined slip ratio Sa (10 to 20%). Thus, it will be seen that if the slip ratio S is controlled in the range of S≦Sa, a large sustainable side force F is ensured, thereby providing driving stability by rear-wheel weighted driving.

The slip ratio S of the rear wheels 14 is represented as follows with a vehicle ground speed V, a radius of a tire r, and a rear-wheel angular velocity ωR.

$$S = (r \cdot \omega R - V)/r \cdot \omega R$$

If the rear-wheel slip ratio S is controlled in a linear range of S<Sa at a torque distribution 3:7, the front-wheel slip ratio S becomes small to be approximately equal to the vehicle speed. Namely, the ground speed V is $$V = r \cdot \omega F$$

where ωF is a front-wheel angular velocity and r is the radius of the tire. Thus, the slip ratio S of the rear wheels 14 is represented as follow.

$$\begin{aligned} S &= (r \cdot \omega R - r \cdot \omega F)/r \cdot \omega R \\ &= (\omega R - \omega F)/\omega R \end{aligned}$$

In accordance with the function of the central differential 5 at cornering, a smaller range than that of a slip ratio Sb (for example 3%) is determined as a dead zone where an apparent slip ratio produced in accordance with the difference between the speed of the front wheels 10 and the speed of rear wheels 14 at a maximum steering angle is included. Thus, the control range becomes Sb<S<Sa. The slip ratio S is calculated within the control range to control the clutch torque Tc as an increasing function of the slip ratio S, so that a small amount of the torque Tc to the rear wheels 14 is transmitted to the front wheels 10. Consequently, the sustainable side force F of the rear wheels 14 can be increased.

The control unit 70 is supplied with output signals from a front-wheel speed sensor 71 and a rear-wheel speed sensor 72. The control unit 70 has a rear wheel slip ratio 10 calculator 73 to which the front-wheel angular velocity ωF and the rear-wheel angular velocity ωR from the sensors 71 and 72 are applied. In the slip ratio calculator 73, the slip ratio S is calculated in accordance with the above mentioned equations. The slip ratio S is applied to a differential operation restricting clutch torque setting section 74. In accordance with the input signal, the clutch torque setting section 74 retrieves the clutch torque Tc from a look-up table.

Figure 4B:
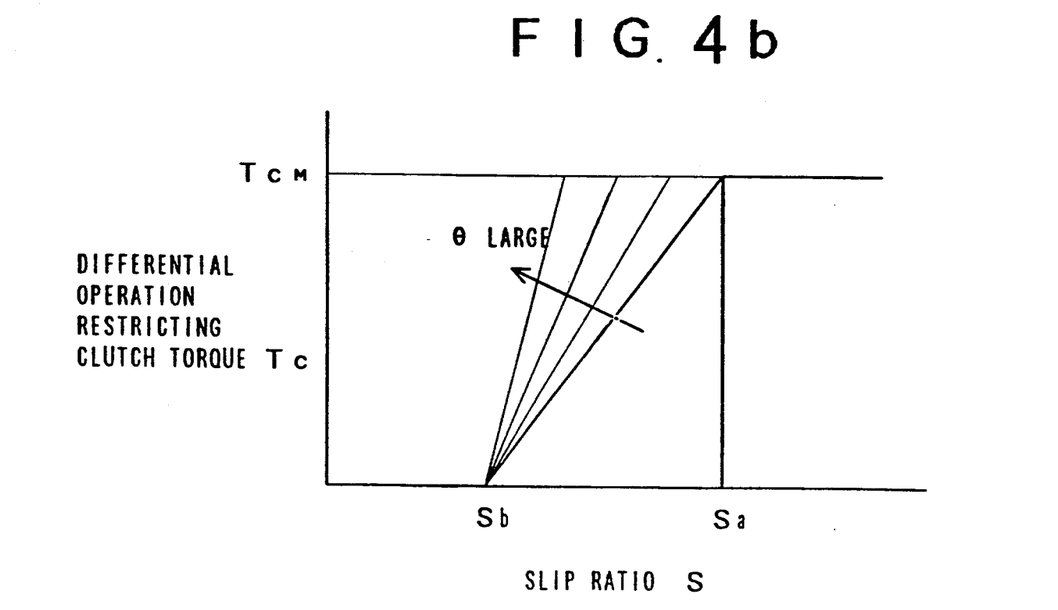
FIG. 4b is a graph,showing differential operation for restricting clutch torque.

FIG. 4b shows clutch torque Tc stored in the look-up table. The clutch torque Tc is an increasing function of the slip ratio S in the control range Sb<S<Sa.

The clutch torque Tc is applied to a control quantity providing section 75 through a correcting section 83, where a duty ratio D corresponding to the derived clutch torque Tc is provided. A duty ratio D provided at the section 75 is applied to the solenoid operated duty control valve 34 through a driver 76.

The system is further provided with a throttle position sensor 78, a steering angle sensor 79, a brake switch 80, and an idle switch 81 for the fixed distribution control. The control unit 70 is provided with a pseudo vehicle speed calculator 77 to which the front-wheel and rear-wheel angular velocities ωF and ωR are applied. Output signals of these sensors and switches, and analogous (estimated) vehicle speed $V_S$ are applied to a condition determining section 82 for deciding a fixed distribution. The fixed distribution determining section 82 has rapid acceleration determining means 82a, steady high speed driving determining means 82b, large steering angle determining means 82c at a low speed driving, braking operation determining means 82d and deceleration determining means 82e. In accordance with a throttle opening degree θ, a steering angle ψ, the output signals of the switches 80 and 81, and the analogous (estimated) vehicle speed $V_S$, the driving conditions are determined in the section 82 for the fixed distribution. The output signal of each determining means 82a to 82e is applied to the correcting section 83 to which the signal from the clutch torque setting section 74 is also applied. The correcting section 83 corrects the torque distribution corresponding to the driving condition and maintains the corrected torque distribution. The drive signal Tt and the analogous vehicle speed Vs are applied to the control unit 90 of the transmission 3.

Figure 5A:
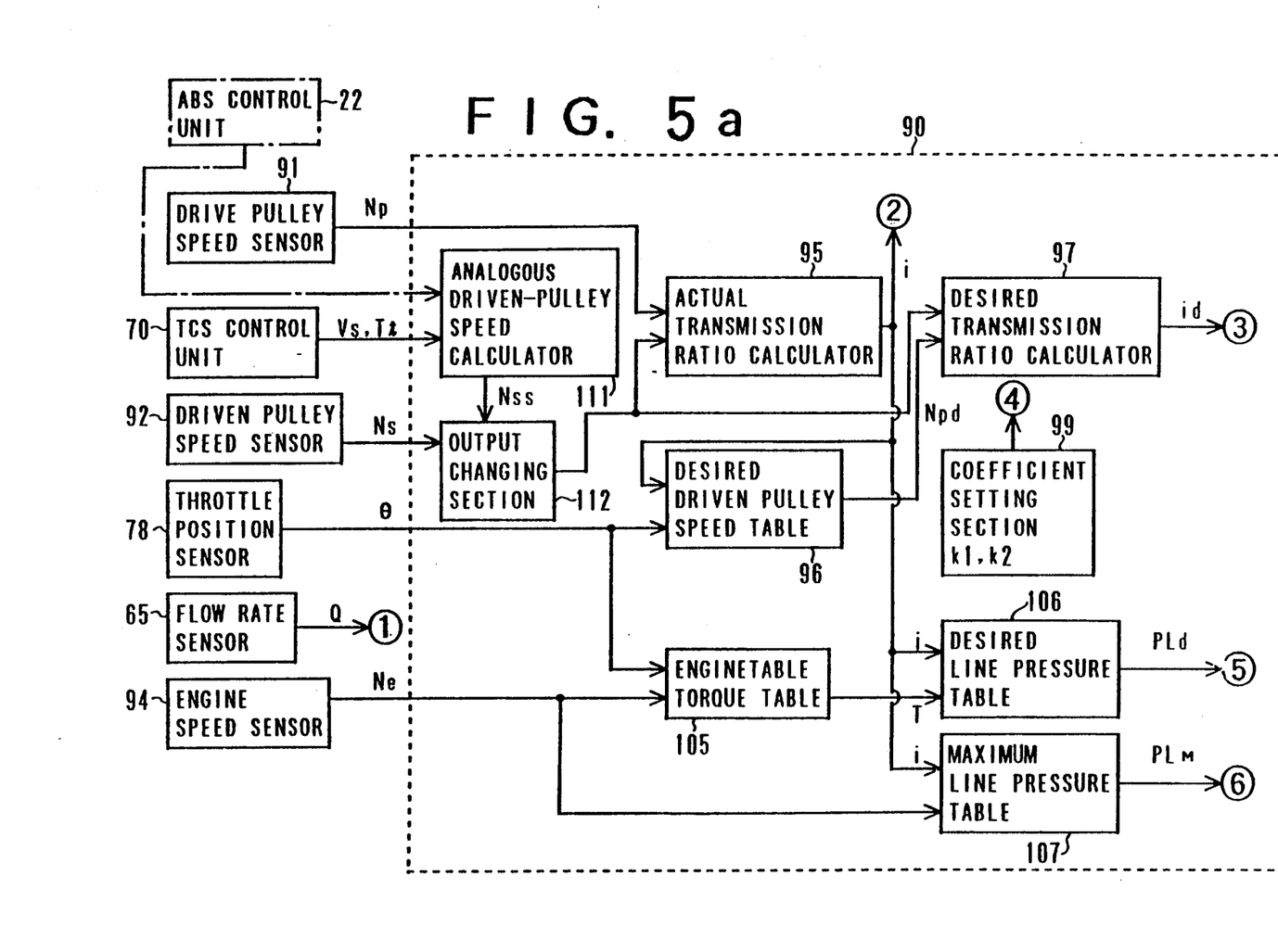
FIGS. 5a and 5b are block diagrams showing a control unit of a transmission ratio control system.
Figure 5B:
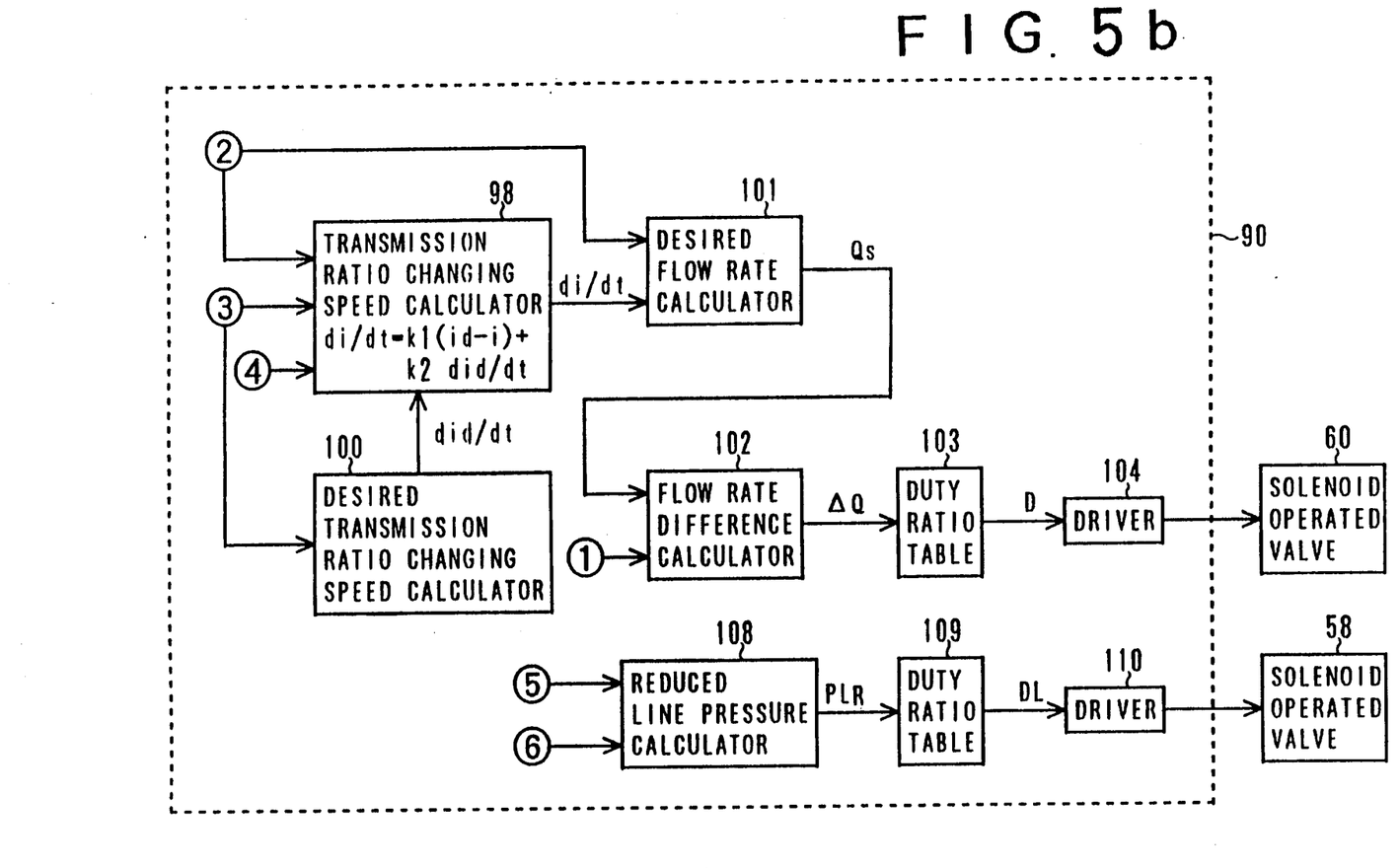

Referring to FIGS. 5a and 5b, the electronic control unit 90 is arranged to control the transmission ratio and the line pressure of the transmission 3. In the system, the flow rate sensor 65, a drive pulley speed sensor 91, a driven pulley speed sensor 92, a throttle position sensor 78, and an engine speed sensor 94 are provided.

A drive pulley speed signal $N_P$ and a driven pulley speed signal $N_S$ of the sensors 91, 92 are fed to an actual transmission ratio calculator 95 to produce an actual transmission ratio i in accordance with $i = N_P/N_S$. The actual transmission ratio i and output signal θ representing the opening degree of the throttle position sensor 78 are fed to a desired drive pulley speed table 96 to derive a desired drive pulley speed Npd in accordance with values of the ratio i and the signal θ. The desired drive pulley speed Npd and the driven pulley speed signal $N_S$ are fed to a desired transmission ratio calculator 97 to calculate a desired transmission ratio id in accordance with $id = Npd/N_S$.

The desired transmission ratio id is fed to a desired transmission ratio changing speed calculator 100 which produces a desired transmission ratio changing speed did/dt. The speed did/dt is the amount of change of the desired transmission ratio id during a predetermined time interval. A coefficient setting section 99 produces coefficients K1 and K2. The actual transmission ratio i, the desired transmission ratio id, the desired transmission ratio changing speed did/dt and coefficients K1 and K2 are applied to a transmission ratio changing speed calculator 98 to produce a transmission ratio changing speed di/dt from the formula as follows.

$$di/dt = K1(id - i) + K2 \cdot did/dt$$

Where K1, K2 are coefficients, id-i is a controlling amount dependent on the difference between the desired and actual transmission ratios, and did/dt is a correction factor for the delay in operation of the system.

The speed di/dt and actual ratio i are applied to a desired flow rate calculator 101 in which a necessary flow rate of the oil to the cylinder 47, namely a desired flow rate Qs corresponding to the transmission ratio changing speed di/dt is calculated. The desired flow rate Qs is applied to a flow rate difference calculator 102 to which the actual flow rate Q detected by the sensor 65 is also applied. In the calculator 102, the difference ΔQ between the desired flow rate Qs and the actual flow rate Q is calculated. The difference ΔQ is applied to a duty ratio determining section 103. A duty ratio D of pulses for energizing the solenoid is determined for correcting the actual flow rate Q to the desired flow rate Qs. The duty ratio D is supplied to the solenoid operated valve 60 through a driver 104. The pressure of oil corresponding to the duty ratio D is supplied to the transmission ratio control valve 52 to change a pressure receiving area Si of the valve 52. Thus, the necessary flow rate Qi of oil corresponding to the speed di/dt is supplied to the cylinder 47.

On the other hand, engine speed Ne from the engine speed sensor 94 and the throttle opening degree $\theta$ from the throttle position sensor 78 are applied to an engine torque table 105 to derive an engine torque T. The engine torque T and the actual transmission ratio i from the calculator 95 is applied to a desired line pressure table 106 to derive a desired line pressure $P_{Ld}$.

In a hydraulic circuit of the control system, oil pressure discharged from the pump and applied to the line pressure control valve varies in accordance with the change of the engine speed Ne, so that a maximum line pressure $P_{LM}$ also varies. In order to detect the variance of the maximum line pressure $P_{LM}$, the control unit is provided with a maximum line pressure table 107 to which the engine speed Ne and the actual transmission ratio i are supplied. Therefore, the maximum line pressure $P_{LM}$ is obtained.

The desired line pressure $P_{Ld}$ and the maximum line pressure $P_{LM}$ are applied to a reduced line pressure calculator 108 wherein a reduced line pressure $P_{LR}$ is calculated based on the proportion of the desired line pressure $P_{Ld}$ to the maximum line pressure $P_{LM}$ as follows.

$$P_{LR} = P_{LM} - P_{Ld}$$

The reduced line pressure $P_{LR}$ is applied to a duty ratio table 109 to derive a duty ratio $D_L$ corresponding to the reduced line pressure $P_{LR}$. The duty ratio $D_L$ is supplied to driver 110 which operates a solenoid operated valve 58 at the duty ratio. Thus, line pressure $P_L$, namely a secondary pressure Ps is controlled to the desired line pressure $P_{Ld}$ dependent on the engine torque T and the actual transmission ratio i.

In order to properly control the transmission during the TCS operation, the control unit 90 is provided with a analogous driven-pulley speed calculator 111 and an output changing section 112.

The analogous driven-pulley speed calculator 111 is applied with the analogous vehicle speed Vs and the drive signal Tt from the TCS control unit 70 for calculating a analogous rotating speed Nss of the driven pulley 45. If a gear ratio from the driven pulley 45 to the rear wheels 14 is G, the analogous vehicle speed Vs is $$Vs = f(Nss \cdot G)$$

Thus, $$Nss = f(Vs/G)$$

The analogous driven-pulley speed Nss is calculated as a function of the analogous vehicle speed Vs and the gear ratio G. The pseudo driven-pulley speed Nss is applied to the output changing section 112 to which the driven pulley speed Ns is applied. The section 112 is provided between the sensor 92 and the calculators 95 and 97. When the analogous speed Nss is applied to the output changing section 112, the section 112 operates to apply the analogous speed Nss to the calculators 95 and 97, respectively, prior to the driven pulley speed Ns. When the analogous speed Nss is not applied to the section 112, the driven pulley speed Ns is applied through the section 112 to the calculators 95 and 97.

Describing the operation of the transmission ratio control system, in an ordinary driving state of the vehicle, the desired transmission ratio id and the actual transmission ratio i are determined larger than the maximum transmission ratio of 2.5. The desired pressure is applied to the transmission ratio control valve 52 to drain the oil from the valve 52 so that a primary pressure Pp becomes the lowest pressure. The line pressure $P_L$ is applied only to the cylinder 48 of the driven pulley 45 so that the drive belt 46 engages with the driven pulley 45 at a maximum running diameter to provide the largest transmission ratio (low speed stage).

Further, the engine torque T is calculated in accordance with the throttle opening degree $\theta$ and the engine speed Ne. Thus, the line pressure controlled by the line pressure control valve 51 is increased in accordance with the maximum transmission ratio i and the engine torque T, thereby transmitting the torque without slipping of the belt 46.

At the start of the vehicle, the power of the engine 1 is transmitted to the main shaft 42 through the clutch 2, the input shaft 40 and the selector mechanism 42, and to the output shaft 44 at the largest transmission ratio by the drive belt 46 and pulleys 43, 45 and further transmitted to the output shaft 4 of the transmission 3 through the reduction gears 49a, 49b. Thus, the vehicle is started, while large torque is transmitted to the rear wheels through the central differential 5. Thus, the proper operability is provided for the respective driving conditions. In addition, the driving conditions for the fixed torque distribution are effectively determined in the wide range.

If the brake switch 80 is closed, a signal is applied to the braking operation determining means 82d where the braking is determined. In the section 83, the restricting torque $T_C$ is corrected to a set value. Thus, the torque distribution is fixed so as to prevent the skid of the wheels. When the brake signal is produced, the analogous (estimated) vehicle speed calculator 77 produces the analogous (estimated) vehicle speed Vs which is applied to the analogous (estimated) driven-pulley speed calculator 111. The calculator 111 calculates the analogous driven-pulley speed Nss in accordance with the analogous speed Nss and the drive signal Tt. The analogous speed Nss is applied to the output changing section 112. The analogous driven-pulley speed Nss is applied to the actual transmission ratio calculator 95 and the desired transmission ratio calculator 97 from the output changing section 112 prior to the driven pulley speed Ns.

Figure 6:
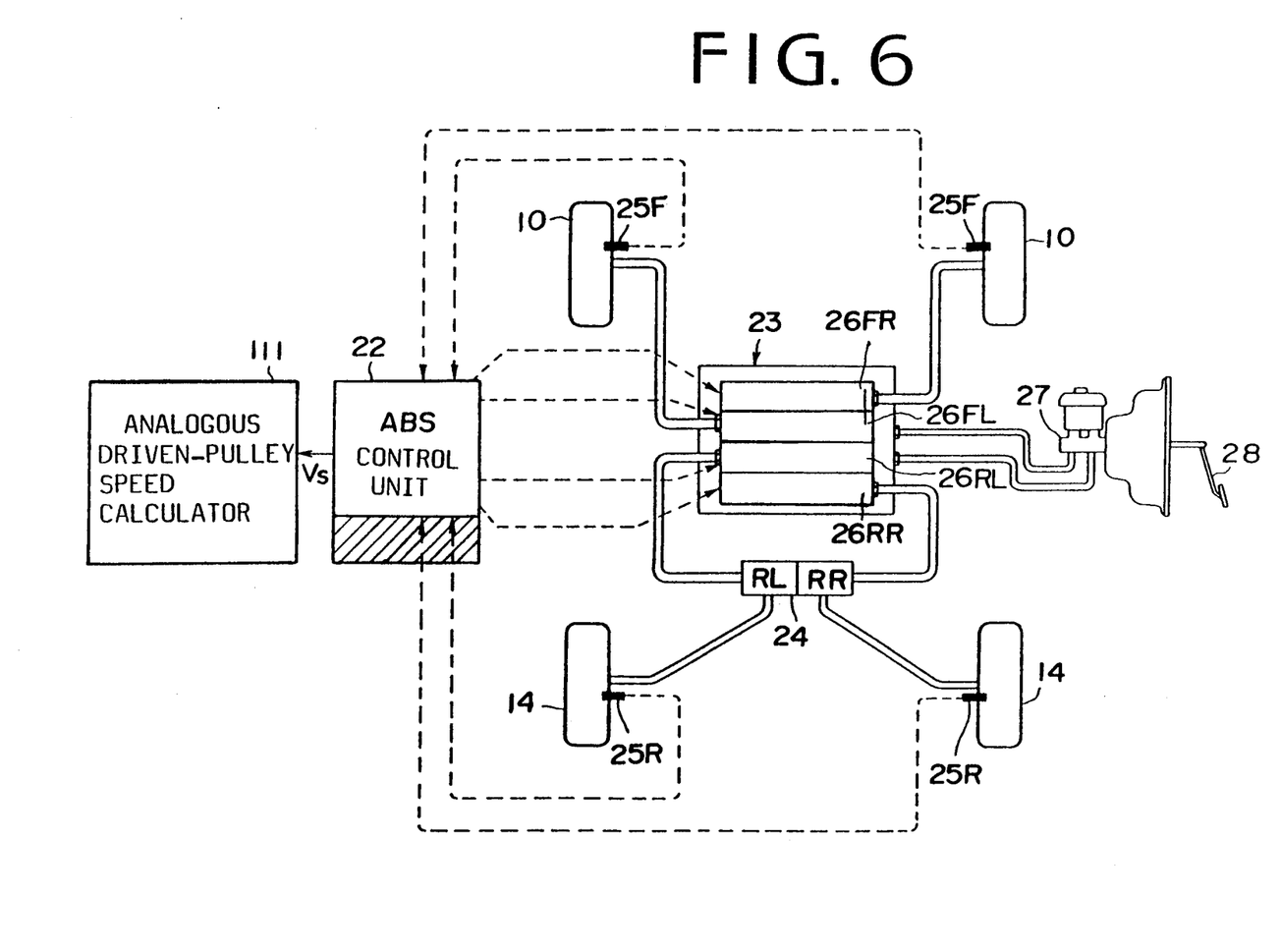
FIG. 6 is a schematic diagram showing another embodiment of the present invention.

Referring to FIG. 6 showing another embodiment of the present invention, which is applied to an antilock brake system (ABS), an ABS control unit is provided instead of the TCS control unit 70 (FIG. 5). A brake pedal 28 is connected to a master cylinder 27 for producing fluid pressure in accordance with the depression of the brake pedal. The master cylinder 27 is communicated with a hydraulic unit 23 having four solenoid valves 26FR, 26FL, 26RR and 26RL for adjusting the pressure. The solenoid valves 26FR and 26FL for the front wheels 10 are communicated with a brake device of the front wheel 10. The solenoid valves 26RR and 26RL for the rear wheels 14 are communicated with a brake device of the rear wheel 14 through a proportioning valve 24 for adjusting the fluid pressure to the rear wheels 14. A front wheel speed sensor 25F and a rear wheel speed sensor 25R are provided adjacent each of front wheels 10 and rear wheels 14, respectively, for detecting a front wheel speed and a rear wheel speed. Front wheel speed signals from the sensors 25F and rear wheel speed signals from the sensors 25R are applied to an ABS control unit 22.

The ABS control unit 22 calculates front and rear wheel speeds, acceleration or deceleration of the wheel, and analogous vehicle speed Vs based on the detected signals from the front and rear wheel speed sensors 25F and 25R. The analogous vehicle speed Vs is compared with the front wheel speed and the rear wheel speed, and the acceleration or the deceleration is determined. In accordance with the comparison and determination, the unit 22 selects a hydraulic pressure mode of the brake pressure such as increasing mode, holding mode, and reducing mode. The control unit 22 produces a brake control signal corresponding to a selected mode which is applied to the solenoid valves 26FR, 26FL, 26RR and 26RL of the hydraulic unit 23. The solenoid valves are operated in accordance with the brake control signal for controlling the brake pressure for the respective front and rear wheels 10 and 14.

If one of the rear wheels 14 is going to be locked, the proportioning valve 24 is operated to control the pressure to the other rear wheel 14 to the same value as that of the locking wheel.

The analogous vehicle speed Vs from the ABS control unit 22 is further applied to the driven pulley speed calculator 111 of the control unit 90. Thus, the transmission ratio during the ABS operation is controlled in the same manner as that during TCS operation.

In the system, during the TCS or ABS operation, the transmission is controlled in accordance with the actual and desired transmission ratios i and id calculated based on the analogous driven pulley signal Nss. Thus, the transmission ratio is controlled corresponding to the analogous vehicle speed Vs.

Consequently, fluctuation of the transmission ratio caused by the variation of the driven pulley speed Ns during the TCS or ABS operation is prevented, thereby reducing the vibration of the transmission 3 to improve durability.

When the TSC control unit 70 or the ABS control unit 22 stops producing output signals, the output of the analogous speed Nss from the calculator 111 is stopped. The changing section 112 produces the driven pulley speed Ns to control the system in the ordinary state.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. In a control system for a continuously variable transmission of a four-wheel drive motor vehicle having an engine, said transmission having a drive pulley and a driven pulley, a clutch and a central differential interposed between said transmission and said clutch for distributing torque from said engine to front wheels and to rear wheels of said vehicle, a front-wheel speed sensor for detectign speed of said front wheels and for generating a frotn wheel speed signal, a rear-wheel speed sensor for detecting speed of said rear wheels and for producing a rear wheel speed signal, an analogous vehicle speed calculator responsive to said front and said rear wheel speed signals for calculating an analogous vehicle speed and for generating a analogous vehicle speed signal, traction control means responsive to said analogous vehicle speed signal and operating condition signals for calculating a front-wheel to rear-wheel distribution ratio of said torque and for producing a clutch driving signal for said clutch, a drive pulley speed sensor for detecting speed of the drive pulley in said continuously variable transmission and for producing a drive pulley speed signal, and a driven pulley speed sensor for sensing speed of the driven pulley of said transmission and for generating a driven pulley speed signal, the improvement in the cotnrol system comprising:

a driven pulley speed calculator responsive to said analogous vehicle speed signal and said clutch driving signal for calculating an analogous rotating speed of said driven pulley and for producing an analogous driven pulley speed signal; and changing means responsive to said driven pulley speed signal and said analogous driven pulley speed signal for applying said analogous driven pulley speed signal instead of said driven pulley speed signal so as to prevent fluctuation of a transmission ratio when said operating conditions change.

2. The system according to claim 1, wherein said analogous vehicle speed is derived from an antilock brake system.

* * * * *